Patented Apr. 29, 1941

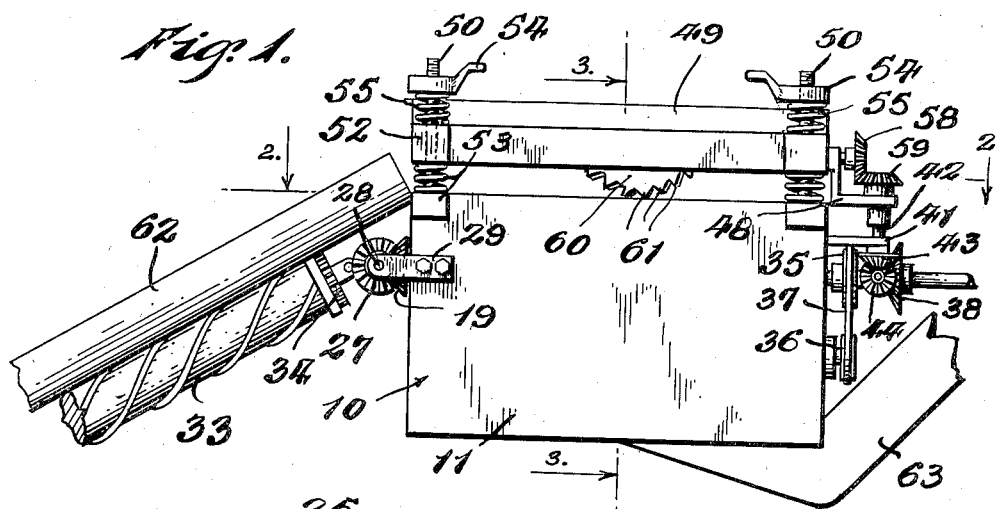
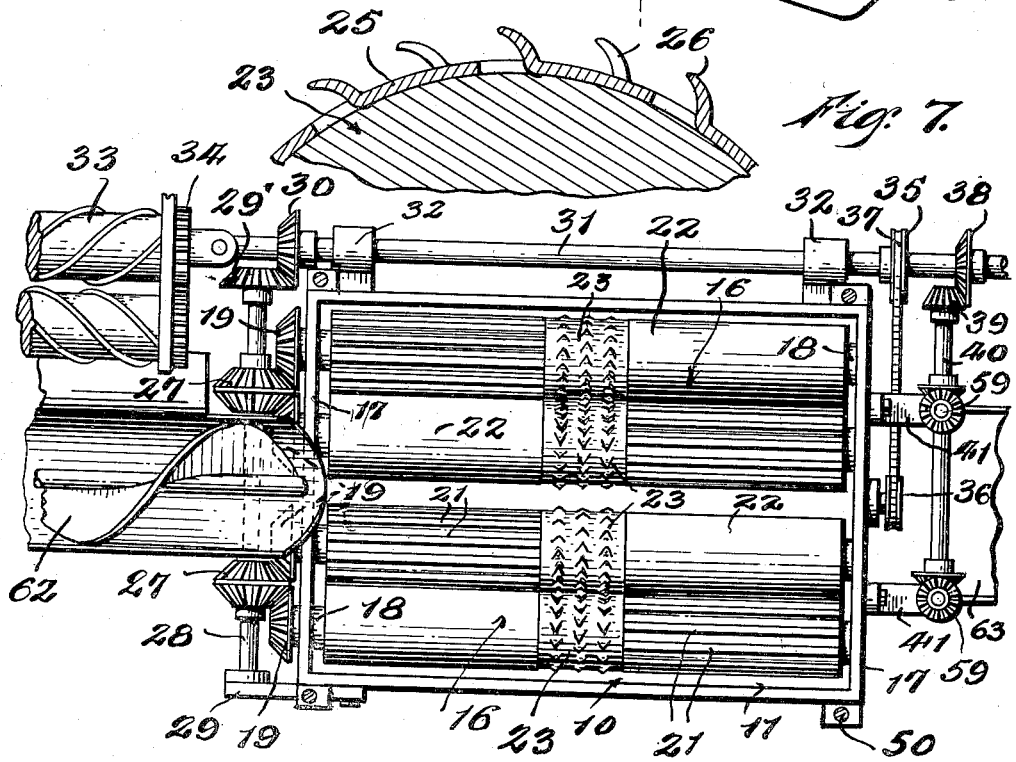

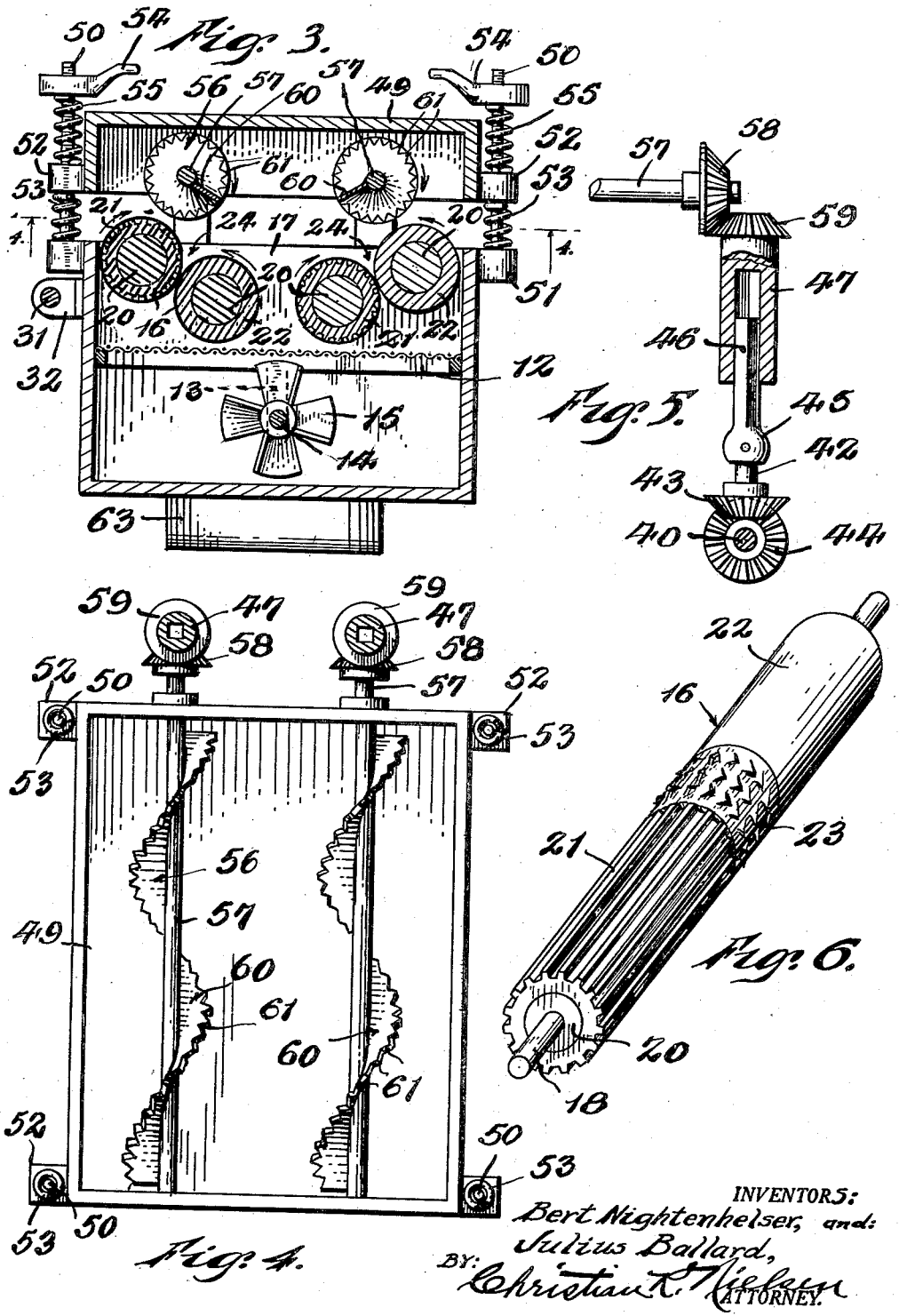

2,239,899

UNITED STATES PATENT OFFICE 2,239,899

COMBINED CORNHUSKING AND AGITATOR DEVICE FOR CORN PICKING MACHINES

Bert Nightenhelser, Westfield, and Julius Ballard, Noblesville, Ind.

Application May 24, 1939, Serial No. 275,532

6 Claims. (Cl. 130—5)

This invention relates to a combined cornhusking and agitator device applicable to corn picking machines, and it consists in the constructions, arrangements and combinations herein described and claimed.

It is a particular object of the invention to provide a husking device particularly applicable to a corn picking machine such as that illustrated and described in our pending application, filed March 11, 1939, Serial Number 261,276.

It is the principal object of the invention to provide a husking device in which a novel construction of husking roll is employed for effectively removing the husks and silk from the corn, thereby permitting the construction of husking rolls of much shorter length than has been possible heretofore, thereby reducing the shelling of kernels from the corn.

It is also an important aim of the invention to provide a novel construction of agitator operable in conjunction with the husking rolls, to speedily remove husks from the corn, the agitator being adjustable to accommodate varying sizes of ears of corn.

Additional objects, advantages and features of invention will be apparent from the following description, considered in conjunction with the accompanying drawings, wherein—

Figure 1 is a side elevation of our combined husking and agitating unit.

Figure 2 is a cross section on the line 2—2 of Figure 1.

Figure 3 is a vertical section on the line 3—3 of Figure 1.

Figure 4 is a cross section on the line 4—4 of Figure 3.

Figure 5 is an elevation partly in section, illustrating a drive unit for the agitator.

Figure 6 is a perspective view of one of the husking rolls employed in the device.

Figure 7 is an enlarged detail of a portion of one of the husking rolls.

Attention is first directed to Figures 1 and 2 of the drawings wherein there is shown a combined husking and agitator unit generally indicated by the reference character 10, which comprises a main housing 11 substantially rectangular as shown, although the shape may vary, as desired. The housing is divided by a riddle 12 vertically movable through a crank 13 of a shaft 14, as will be explained in greater detail hereinafter. The shaft 14 has fixed thereon a fan 15 for drawing husks, dirt, etc., down upon the riddle.

Above the riddle 12 and extending longitudinally of the housing 11, two pairs of husking rolls 16 are revolubly mounted in respective end walls 17 of the housing. Each roll 16 has a shaft 18 extended through the front wall 17 and has keyed thereto a bevel gear 19 providing a drive for the rolls, as will be described.

The husking rolls 16 are identical in construction and a description of one will suffice for an understanding thereof, attention being now directed to Figures 6 and 7. The roll preferably comprises a steel core 20 integrally formed with the shaft 18, and upon this core at one end there is securely fixed a corrugated sleeve 21 and upon the other end of the core there is secured a smooth sleeve 22. Intermediate the sleeves 21—22 and circumscribing the core, a rasp 23 is mounted.

The sleeves 21—22 are preferably formed of hard rubber and of equal lengths, with the rasp positioned medially of the length of the core and abutting respective adjacent ends of the sleeves, as clearly shown in Figure 2.

The corrugations of the sleeve 21 extend lengthwise thereof as clearly shown in Figures 2 and 6, and when the rolls are arranged within the housing the corrugations of the sleeve 21 are complemental to the smooth sleeve 22 of the next adjacent roll, and each pair of the rolls are spaced apart to provide a clearance as at 24, to permit passage of husks, silk and the like to the riddle 12.

The provision of the corrugated sleeve operable in conjunction with a smooth sleeve insures a smooth, yet efficient gripping action upon the husks of corn without liability of loosening kernels from the cobs as they pass along lengthwise of the rolls.

The rasp 23 is formed from a cylindrical sleeve 25 of sheet metal such as steel and comprises a plurality of outwardly struck teeth 26, the latter lying slightly outward of the circumference of the rolls. Therefore it will be apparent that with the rolls rotating in a direction as indicated by arrows, the teeth of one roll cooperate with teeth of the other roll and thus effectively remove the husks from the cobs of corn, and preferably the teeth are arranged in staggered relation as shown in Figure 7.

In order to drive the rolls the bevel gears 19 of each pair of rolls are respectively in mesh with a toothed face of a double faced gear 27. A pair of gears 27 are thus provided keyed to a shaft 28 suitably journalled in brackets 29 fixed to the casing. One end of the shaft 28 has fixed thereto a bevel gear 29' in mesh with a similar gear 30 fixed to a driven shaft 31, the latter extending longitudinally of the casing and journalled in brackets 32.

The shaft 31 is driven from the tractor as shown in our previously mentioned application and is operatively connected to one of a pair of snapping rolls 33, the drive to the other snapping roll being through meshed gears 34 as shown.

Upon the shaft 31, at the opposite end a pulley 35 is keyed, aligned with a pulley 36 keyed to the fan shaft 14 and about these pulleys there is trained a belt 37, effecting rotation of the fan 15 and similarly actuating the riddle 12. The shaft 31 also includes a bevel gear 38 in mesh with a similar gear 39 keyed to a shaft 40 extending transversely of the other end of the casing, the shaft being suitably journalled in bearings 41, the latter also including a bearing for support of vertically disposed shafts 42, the latter having a bevel gear 43 in mesh with a similar gear 44 fixed to the shaft 40. The shafts 42 having a universal joint 45 and an angular stud extension 46 adapted to telescopically receive a socket 47, the latter being revolubly mounted in brackets 48 fixed to an agitator casing 49.

The agitator casing 49 is of similar size and shape as the casing or housing 11 and is positioned thereabove by means of rods 50 disposed at respective ends of the housings 11, preferably at the corners of the housing. The rods 50 are fixed in suitable lugs 51 of the housing and the agitator casing 49 has similar lugs 52 complemental to the lugs 51. The rods 50 are extended through apertures of the lugs 52 and interposed between the lugs and encircling the rods, respective helical springs 53 are provided. The rods 50 are threaded at their upper ends to receive respective wing nuts 54. Upon each of the rods 50 a helical spring 55 is positioned between the lugs 52 and wing nut 54. It will thus be seen that the agitator housing 49 is resiliently mounted with respect to the husking roll housing and is permitted vertical movement with respect to the husking rolls, which movement permits entrance of ears of corn of varying diameters, yet insuring positive husking of each ear, as it passes longitudinally along the husking rolls.

It will be obvious that the agitator case 49 may be adjusted vertically with respect to the husking rolls by manipulating the wing nuts 54 and therefore the agitating action upon ears of corn may be readily varied.

Within the housing 49 we provide a pair of agitator rolls 56 journalled in the end walls of the casing, each roll having a shaft 57 one end of which has fixed thereto a bevel gear 58 in mesh with a bevel gear 59 fixed to the socket 47. The shaft 57 will be driven in the same direction as the uppermost husking roll 16, while the lowermost husking roll 16 will be driven in the opposite direction.

Each of the shafts 57 include a helicoidal screw thread 60 having a serrated or toothed periphery 61, and preferably the screw 60 will be formed of a hard rubber or similar substance which will have sufficient rigidity to effect an agitation and loosening of the husks to permit gripping action by the husking rolls.

The operation

The operation will be readily understood from the following description.

The snapping rolls 33 will snap the corn from the stalks and pass it to the screw conveyor 62 which will conduct the corn to the combined husker and agitator, the corn entering between the two lowermost rolls 16 and due to the direction of rotation of the rolls, the corn will be moved upwardly to a point to lie between respective rolls 16 in a position to be engaged by the teeth of the agitator rolls 56. The teeth of the agitator rolls will loosen the husks and advance the corn along the rolls, while the husking rolls 16 will grip the husks and tear them from the corn for discharge upon the riddle 12. The rasp 23 functions to also remove husks as well as remove corn silk. By arranging the husking rolls 16 so that a corrugated surface of one roll cooperates with a smooth surface of its companion roll the husks will be very effectively gripped, insuring a rapid separation of the husks from the corn, and this is further enhanced due to suction created by the fan 15 tending to draw the husks downwardly between the rolls. The husked corn finally discharges into a chute 63 from whence it passes on to a loading bin, not shown.

While we have shown and described a preferred construction, this is by way of illustration only, and we consider as our own, all such modifications in structure as fairly fall within the scope of the appended claims.

We claim:

1. A combined cornhusking and agitating device comprising a housing, a pair of companion husking rolls rotatably mounted therein and extending longitudinally of the housing, an agitator housing mounted above the first named housing, a pair of agitator rolls revolubly mounted in the agitator housing, one agitator roll being cooperable with each pair of husking rolls, and extending longitudinally thereof, each of said agitating rolls having a serrated helical screw thread extending the length thereof, said husking rolls having a corrugated portion complemental to a smooth portion, each roll having an annular rasp member intermediately of its length and means for driving the husking and agitator rolls.

2. A combined cornhusking and agitator device comprising a housing, a pair of companion husking rolls mounted therein, means for rotating paired rolls in opposite directions, said husking rolls having corrugations at one end complemental to a smooth portion, an annular rasp on the husking rolls intermediate the length thereof, an agitator housing positioned above the first named housing, said agitator housing being vertically adjustable with respect to the first named housing, a pair of agitator rolls revolubly mounted in the agitator housing, the rolls being complemental to respective pairs of husking rolls, each agitator roll having a toothed helical thread throughout its length, and means to drive said agitator rolls.

3. The structure of claim 2 in which the drive comprises a shaft driven from the drive of the husking rolls, said shaft having a telescopic connection permitting vertical adjustment of the agitator housing.

4. A combined cornhusking and agitator device comprising a housing open at its top having husking rolls supported therein and upright standards supported thereon, an agitator housing above the first mentioned housing and supporting agitating rolls, said agitator housing being open at its bottom and said agitator rolls being supported in said agitator housing so as to be parallel to and cooperate with said husking rolls, said agitator housing having apertured lugs for receiving respective standards, spring means on the standards interposed between the housings for resilient support of the agitator housing, said standards having screw threads, a helical spring on each standard above the lugs of the agitator housing, nuts engaged upon the threaded portions of the standards above the last named springs, and means for driving the husking and agitator rolls.

5. A husking roll for cornhusking machines comprising a steel core, a resilient corrugated sleeve on the core at one end, the corrugations extending longitudinally thereof, a smooth resilient sleeve upon the core at the other end and an annular rasp positioned on the core between the sleeves.

6. A husking roll unit comprising a pair of rolls arranged in close parallel relation, each of said rolls having a longitudinally corrugated resilient portion and a smooth resilient portion, each of said portions extending around the periphery of the roll, the corrugated portion of one roll being complemental to the smooth portion of the other roll, each roll further having an annular rasp intermediate the length of the roll and positioned between the corrugated and smooth portions, said rasps being in opposed relation to each other.

BERT NIGHTENHELSER.
JULIUS BALLARD.